United States Patent Office 3,259,654
Patented July 5, 1966

3,259,654
REACTION OF PHOSPHORUS TRICHLORIDE WITH CHLORINATED HYDROCARBON POLYMERS OF LOWER MONO-OLEFINS
William M. Le Suer, Cleveland, Ohio, assignor to The Lubrizol Corporation, Wickliffe, Ohio, a corporation of Ohio
No Drawing. Filed July 29, 1963, Ser. No. 298,397
9 Claims. (Cl. 260—543)

This application is a continuation-in-part of co-pending application Ser. No. 809,623, filed April 29, 1959, and now abandoned.

This invention relates to a novel method for the incorporation of phosphorus into organic compounds, and in a more particular sense to such a process by which liquid, oil-soluble phosphorus-containing organic compounds are made available for the further preparation of acidic compounds.

It has long been known that the presence of phosphorus in certain oil-soluble organic compounds appears to impart to such compounds certain properties which make them useful as additives in lubricant compositions. Such use may be based upon its ability to provide protection from the ravages of extreme pressure, as in a gear lubricant, or it may act to inhibit corrosion, oxidation, rust, etc. For this reason organic phosphorus compounds have achieved a unique status in the field of lubrication chemistry. They are also used in fuel oils, such as hydrocarbon fuel oils and gasolines, to inhibit deterioration of the oil or to disperse the deterioration products so as to prevent the formation of harmful deposits.

Typical examples of such useful phosphorus-containing organic compounds include the products prepared by the reaction of relatively high molecular weight hydrocarbons (M.W. 300–2000) with a phosphorus sulfide. Sulfur may also be included in the reaction mixture, and the resulting product, when subjected to hydrolysis and neutralization with a basic metal compound such as lime, produces a valuable detergent for use in lubricating oils. Such a product acts also to inhibit corrosion. Valuable lubricant additives can also be obtained from the reaction of olefins with phosphorus chlorides in the presence of aluminum chloride.

Still further, the reaction of the alcohols with phosphorus pentasulfide produces phosphorodithioic acids and the zinc and barium salts of these are expecially well known inhibitors of corrosion and oxidation in a lubricating oil. Still another example of the utility of organic phosphorus compounds has been observed with respect to the reaction product of alcohols and phosphorus trichloride. Such products have been used for many years in gear lubricants in which they are effective in the protection of the gear surfaces from extreme pressure. The reaction of terpenes with phosphorus pentasulfide also provides useful corrosion inhibitors. These latter products are useful as such, and also they may be neutralized with zinc oxide or barium oxide to yield other useful compositions.

It is, therefore, a principal object of this invention to provide novel oil-soluble, phosphorus-containing compositions.

It is a further object of this invention to provide novel compositions which are useful in lubricants.

It is still a further object of this invention to provide a novel process by which such phosphorus-containing organic compositions can be prepared.

It is another object of this inventioin to provide novel compositions useful as additives in fuels.

It is another object of this invention to provide improved fuel compositions.

It is another object of this invention to provide improved lubricant compositions.

These and other objects are accomplished by the process for the preparation of liquid, oil-soluble phosphorus-containing compositions which comprises heating at a temperature above about 130° C., a mixture of a chlorinated hydrocarbon polymer of a lower mono-olefin containing from about 0.1% to about 20% by weight of chlorine, and from about 0.25 mole to about 2.0 moles of phosphorus trichloride per atom of chlorine in said polymer, and then contacting the mass with a nitrogen compound selected from the class consisting of ammonia, pyridine, and aliphatic hydrocarbon amines to remove a substantial portion of the water-soluble chlorine.

The reactivity of the chlorinated olefin polymer with phosphorus trichloride has not heretofore been realized, particularly in view of the known unreactivity of polyolefins in general with phosphorus halides, and particularly with phosphorus trichloride. Thus, it is a matter of common knowledge that polyisobutene will not react with phosphorus trichloride under ordinary conditions. The reaction can be made to proceed under certain conditions, ordinarily involving the use of a metal halide catalyst such as aluminum chloride or the presence of an oxidizing agent. But a mixture of these two reactants alone cannot be made to produce a phosphorus-containing product. It was unexpected, therefore, to note a definite chemical reaction between a chlorinated polyisobutene, for example, and phosphorus trichloride merely upon heating a mixture of these two reactants. It is apparent from these observations that the presence of chlorine in a polyolefin molecule serves to activate that molecule with respect to its susceptibility to reaction with phosphorus trichloride. The nature of this "activation" is not known.

The relative amounts of reactants used in the first step of the process of this invention are related to the reactivity of the chlorine in the polymer chain with the phosphorus trichloride. The amount of phosphorus trichloride used should be within the range of from about 0.25 to about 2.0 moles per atom of chlorine in the chlorinated olefin polymer. It is preferred to use an amount of phosphorus trichloride near the upper range of this ratio, although the reason for this is based solely upon economy. A principal purpose of the process is the incorporation of phosphorus into the product, and the chlorine in the polymer chain serves merely to aid in this incorporation of phosphorus. Thus, the chlorinated polyolefin ordinarily will contain a minimum amount of chlorine (for reasons of economy) with respect to this function, viz., the incorporation of phosphorus into the product. The apparent maximum effectiveness of the chlorine in serving such purpose is reflected by this upper limit of the ratio of phosphorus trichloride to chlorine, i.e., 2:1. The use of a larger amount of phosphorus trichloride than indicated by this ratio results in a product having no more phosphorus than that obtained by the use of two moles of phosphorus trichloride per atom of chlorine in the polymer chain. Similarly the use of less phosphorus chloride than indicated by this ratio of 2:1, while in no way detrimental to the reaction of the process, indicates the presence in the polymer molecule of more chlorine than is needed to aid in the incorporation of a maximum quantity of phosphorus.

Polyolefins of virtually all molecular weights are usable in the process. That is to say, the presence of chlorine in any polyolefin serves to activate the polyolefin with respect to its reactivity with phosphorus trichloride. As a practical matter, however, it has been noted that these polyolefins having molecular weights within the broad range of from about 350 to about 50,000 are most useful. Polyolefins having molecular weights lower than 350 do not seem to be benefited nearly so much by the presence of chlorine in their molecular structure (for the purpose of this invention) as do the higher molecular weight polymers. At the other end of the range of molecular weight it has been noted that chlorinated polyolefins having a molecular greater than 50,000 while reactive to produce useful products, are less reactive than the lower molecular weight chlorinated polyolefins and correspondingly less satisfactory for the purposes of this invention.

The olefin polymer from which the chlorinated hydrocarbon polymers of the above-noted process are derived include principally the substantially aliphatic polymers of lower mono-olefins such as ethylene, propene, isobutene, and 1-butene. The polymers also include interpolymers of these lower mono-olefins with a minor amount of aromatic olefins, diolefins, and cyclic olefins provided that at least about 95% by weight of the interpolymers is comprised of the lower mono-olefin units so that the substantially aliphatic character of the polymer is not altered. Examples of polymers include polyisobutene, polypropenes, polyethylenes, copolymer of 96% of isobutene and 4% of styrene, copolymer of 98% of isobutene and 2% of chloroprene, copolymer of 98% isobutene, 1% of butadiene, and 1% of n-hexene. Polymers of isobutene are most frequently used because of their ready availability.

The method by which the substantially aliphatic olefin polymers may be chlorinated is not critical. A convenient method comprises passing a stream of chlorine into the olefin polymer at a temperature of 50–100° C. till the desired amount of chlorine has been incorporated into the polymer molecules. An inert solvent such as carbon tetrachloride, ethylene dichloride, mineral oil, or n-hexene may be used in the chlorination reaction.

The reaction conditions of the first step of the process involve merely mixing the reactants and heating the mixture, usually with agitation, at a temperature in excess of about 130° C. It will be noted that this minimum reaction temperature exceeds that of the boiling point of phosphorus trichloride. For this reason it is necessary to mix the reactants by adding the phosphorus trichloride portionwise to the chlorinated polyolefin, and to provide means for the return of unreacted, volatilized phosphorus trichloride to the reaction mixture. As a practical matter, it is preferred to add the phosphorus trichloride through a tube extending beneath the surface of the liquid reaction mixture, thus insuring intimate contact and maximum reaction of the two reactants. Ordinarily the temperature of the reaction mixture is within the range of 150–225° C. As indicated earlier, the process may be carried out at temperatures as low as about 130° C.; somewhat higher temperatures may be employed, within the limits of the thermal stability of the reactants and product. There seems to be no advantage in carrying the reaction out at temperatures higher than about 250° C., and in this light a practical operating range of temperature for this step of the process may be considered as extending from about 130° C. to about 250° C.

The intermediate product available from the above-described step contains phosphorus and chlorine; much of the chlorine is loosely bonded to the polymeric chain and is quite easily removed. For the purpose of this invention a substantial proportion of such loosely bonded chlorine is removed in the second step of the process. This removal of chlorine is effected by heating with a nitrogen compound such as ammonia, pyridine, and aliphatic hydrocarbon amines. For the purposes of this invention the aliphatic hydrocarbon amines include alkyl polyamines and alkylene amines. Examples of such aliphatic hydrocarbon amines include ethyl amine, n-propyl amine, hexyl amine, 2-ethylhexyl amine, n-dodecyl amine, di-pentyl amine, and tert-octyl amine.

The term "alkylene amine" is used herein to denote the generic class of polyamines conforming for the most part to the structure $$(H_2N-(Alkylene\ NH)_xH)$$

in which x is an integer preferably less than about 6, and the alkylene radical is preferably a lower alkylene radical such as ethylene, propylene, trimethylene, tetramethylene, or the like. Thus, it includes, for example, ethylene diamine, diethylene triamine, triethylene tetramine, tetraethylene pentamine, trimethylene diamine, propylene diamine, pentaethylene hexamine, etc. The ethylene amines are especially useful. They are discussed in some detail under the heading "Ethylene Amines" in "Encyclopedia of Chemical Technology," Kirk and Othmer, volume 5, pages 898–905, Interscience Publishers, New York (1950). Such compounds are prepared most conveniently by the reaction of an alkylene dihalide, e.g., ethylene dichloride, with ammonia or a primary amine. This reaction results in the production of somewhat complex mixtures of alkylene amines including cyclic condensation products such as piperazine, N-aminoethyl-piperazine, etc. These mixtures find use in the process of this invention. On the other hand, quite satisfactory products may be obtained also by the use of pure alkylene amines. An especially useful alkylene amine, for reasons of economy as well as effectiveness of the products derived therefrom, is a mixture of ethylene amines prepared by the reaction of ethylene chloride and ammonia having a composition which corresponds to that of tetraethylene pentamine.

The reaction of the phosphorus and chlorine-containing intermediate with the nitrogen compound is preferably effected at temperatures of from 100° C. to the decomposition temperature of the mixture. The intermediate product is heated to 150° C., for example, whereupon ammonia is blown through the mass. The treatment with ammonia is continued until all of the unstably bonded chlorine is removed, and in most cases one hour of such treatment is sufficient to accomplish this result. As stated previously, removal of chlorine may alternatively be carried out by adding pyridine or an aliphatic hydrocarbon amine to the intermediate product whereupon the mixture is heated at a temperature of from about 80° C. to the decomposition temperature and the preferred upper limit is generally from about 200° C. to 225° C. The product which results from this step contains an appreciable amount of chlorine ranging from 0.1% upward but the exact structure of the product is not known. It will be seen that the upper limit of such chlorine content is determined largely by the chlorine content of the chlorinated polymer used as a starting material.

The determination of water-soluble chlorine is made by adding to 3 grams of a sample, about 20 ml. of a solvent mixture comprising 100 parts of benzene, 99 parts of isopropyl alcohol and 1 part of water (D974–58T, page 452 of the 1958 ASTM Manual). This mixture of sample and solvent is agitated to insure complete mixing and then extracted with water. The water layer is acidified with nitric acid and titrated with aqueous silver nitrate.

The process of the invention may be illustrated in further detail by the following examples. For the purpose of these examples the equivalent weight of the chlorinated polymer is that weight containing 1 atomic weight of chlorine, and the equivalent weight of the nitrogen containing reactant is based on the number of nitrogen-containing radicals in its structure. Thus, ethylene diamine has 2 equivalents per mole and tetraethylene pentamine has 5 equivalents per mole.

EXAMPLE 1

A polyisobutene having a molecular weight of 1000 is chlorinated to a chlorine content of 4.3%. To 900 parts of this chlorinated polyisobutene at 110°–180° C. there is added portionwise over a period of 15 hours, 150 parts of phosphorus trichloride. After an additional 2 hours of heating at 195° C., the mixture is freed of volatile components by heating at reduced pressure for an additional 1.5 hours, and then blown with nitrogen for 2 hours. The residue is the product which is found to have the following analyses: percent phosphorus, 2.0; percent chlorine, 1.9; percent water-soluble chlorine, 1.4.

Ammonia is blown through 300 parts (0.16 mole) of this chlorinated polyisobutene-phosphorus trichloride reaction product for a period of 4.5 hours while maintaining the reaction temperature of 146°–156° C. A white sediment is observed during the reaction. The reaction mixture is filtered through a filter aid and the filtrate is the product having the following analyses: percent phosphorus, 1.9; percent chlorine, 1.8; percent water-soluble chlorine, 1.2; acid number, 25.

EXAMPLE 2

A mixture of 30 parts tert-octyl amine and 300 parts of the chlorinated polyisobutene-phosphorus trichloride reaction product of Example 1 is heated to 190° C. over a period of 3 hours and maintained at 190°–220° C. for an additional 2.2 hours. Another 15 parts of tert-octyl amine is added and the temperature is maintained between 190°–220° C. for 3 more hours. The mixture is then heated at 170° C./10 mm. for 0.5 hour and the residue is filtered. The filtrate is the desired product and is found to have the following analyses: percent phosphorus, 1.9; percent water-soluble chlorine, 0.3; acid number, 22.

EXAMPLE 3

A mixture of 15 parts of pyridine and 300 parts of the chlorinated polyisobutene-phosphorus trichloride reaction product of Example 1 is heated to 190° C. over a period of 3 hours and held at this temperature for an additional 7 hours. The volatile components are removed by heating at 110°–130° C./18 mm. for 0.5 hour and filtered. The filtrate is the desired product having the following analyses: percent phosphorus, 1.8; percent water-soluble chlorine, 0.9; acid number, 29.

EXAMPLE 4

A polyisobutene having a molecular weight of 1000 is chlorinated to a chlorine content of 10%. To 1000 parts of this chlorinated polyisobutene at 110°–170° C., there is added over a period of 10 hours 333 parts of phosphorus trichloride. After an additional 2 hours of heating at 190° C., the mixture is freed of volatile components by heating at reduced pressure for an additional 1 hour and then blown with nitrogen for 2 hours. To 300 parts of this chlorinated polyisobutene-phosphorus trichloride reaction product there is added 25 parts of ethylene diamine and the reaction mixture is heated to 150° C. Any amine which volatilizes during the reaction is condensed on a cold finger and returned to the reaction mixture. The reaction mixture is maintained at 150° C. for 5 hours, and the residue is filtered through filter aid. The filtrate is the desired product.

EXAMPLE 5

A polyisobutene having a molecular weight of 325 is chlorinated to a chlorine content of 14.0%. To 700 parts of (3.2 equivalents) this chlorinated polyisobutene at 160°–190° C. there is added 110 parts (0.8 mole) of phosphorus trichloride. The phosphorus trichloride is added portionwise over a period of 1.5 hours, and is added through a tube extending beneath the surface of the stirred reaction mixture. The resulting mixture is heated for an additional 10 hours at 180°–210° C., then to 180° C./30 mm. To this residue there is added 170 parts (4.5 equivalents) of diethylene triamine and the mixture is heated to 160°–180° C. for 2 hours and at 160° C./35 mm. for 1 hour. The reaction mixture is filtered. The filtrate is the desired product.

EXAMPLE 6

To 761 grams of chlorinated polypropene (prepared from polypropene having a molecular weight of 860) having a chlorine content of 5.1%, there is added at 165°–186° C., 133 grams of phosphorus trichloride. The phosphorus trichloride is added portionwise over a period of 2.5 hours and when all has been added, the resulting mixture is heated at 165°–210° C. for 10 hours. The reaction mixture is then heated to 170° C./20 mm. and diluted with 70 parts of mineral oil. Dodecyl amine (200 parts) is added and the mixture is heated for 1 hour at 160°–180° C. and at 160° C/20 mm. for 0.5 hour. The residue is filtered and the filtrate is the desired product.

EXAMPLE 7

A polyisobutene having a molecular weight of 1000 is chlorinated to a chlorine content of 4.6%. To 900 parts of this chlorinated polyisobutene at 130°–190° C. there is added portionwise over a period of 15 hours, 150 parts of phosphorus trichloride. After an additional 2 hours of heating at 195° C., the mixture is freed of volatile components by heating at a reduced pressure for an additional 1.5 hours. The residue is the desired product which is found to have the following analyses: percent phosphorus, 2.11; percent chlorine, 1.77.

A mixture of 300 parts of this chlorinated polyisobutene-phosphorus trichloride reaction product and 75 parts of a commercial mixture of ethylene amine having an average molecular weight corresponding to that of tetraethylene pentamine is heated to 190° C. in 2 hours. The reaction mixture was maintained at this temperature for an additional 3.5 hours. The residue is the desired product and is found to have the following analyses: percent phosphorus, 1.73; percent nitrogen, 4.69; percent water-soluble chlorine, nil.

The utility of the process of this invention resides in the preparation of valuable lubricant and fuel oil additives. The products of the process of this invention are particularly useful as additives in lubricating oils and hydrocarbon fuels to improve their rust-inhibiting properties, corrosion-inhibiting properties, and sludge-resistant properties. For the improvement of lubricating oils, especially mineral lubricating oils, generally from about 0.05% to about 10% of the phosphorus-containing compositions of this invention will be employed.

The lubricating oils in which the additive of this invention are useful may be of synthetic, animal, vegetable, or mineral origin. Ordinarily, mineral lubricating oils are preferred for reasons of their availability, general excellence, and low cost. For certain applications oils belonging to one of the other three groups may be perferred. For instance, synthetic polyester oils such as didodecyl adipate and di-2-ethylhexyl sebacate are often preferred as jet engine lubricants. Normally the oils preferred will be fluid oils ranging in viscosity from about 40 Saybolt Universal seconds at 100° F. to about 200 Saybolt Universal seconds at 210° F.

To prepare the final oil compositions, the products of the process of this invention may added to the oil at the appropriate concentration. Alternatively, a concentrate of the additive may be prepared by dissolving the additive in a limited amount of the oil and a concentrate may then be diluted with additional amounts of the oil to prepare a final oil composition. The lubricating compositions in which the additives of this invention are present may contain other additives such as supplemental ashless detergents, metal-containing detergents, corrosion inhibitors, rust inhibitors, oxidation inhibitors, load-carrying additives, anti-foam additives, pour point depressants, viscosity index improving agents, additives to improve the frictional characteristics, etc. The concentration of these additives in the lubricating compositions may range from about 0.001% to 20% by weight.

As mentioned previously, the products of the process of this invention are also useful in other compositions, especially hydrocarbon compositions such as gasolines, burner fuel oils, cutting oils, transformer oils, hydraulic fluids, etc. The hydrocarbon compositions for use in gasoline internal combustion engines may contain from about 0.5% to about 5% of the additive while gasolines and burner fuel oils may contain as little as 0.001% or even less. In a liquid hydrocarbon fuel such as leaded gasoline, as little as 0.0001% of the phosphorus-containing composition is effective as a detergent and dispersant. In most applications, it is seldom necessary to employ more than about 1% of the phosphorus compositions of this invention in a hydrocarbon fuel.

The effectiveness of the products obtained by the process of this invention to inhibit the tendency of fuel oil to form sludge is shown by the results of a fuel oil detergent test (Table I). In this test a mixture of 4 liters of a catalytically cracked No. 2 light fuel oil containing the additive at a concentration of 25 lbs./1000 bbl. and 15 grams of a synthetic sludge (prepared by homogenizing a 50/40/10, by weight, mixture of distilled water/fuel oil/carbon black) is circulated for 2 hours in a fuel oil burner pump (Model J3BC–1003, manufactured by Sundstrand Machine Tool Company, Illinois), equipped with a 100-mesh Monel strainer. The sludge retained on the strainer is washed with acetone and weighed. The effectiveness of the additive is indicated by the percent reduction of the sludge retained on the strainer as compared to the sludge formed from the fuel oil containing no additive. A fuel whose rating is greater than 90% is considered to have excellent clogging properties.

*Table I*

FUEL OIL DETERGENCY TEST

| Additive | Sludge | |
|---|---|---|
| | Milligrams | Percent Reduction |
| None | 460 | |
| Product of Example 7 | 1.9 | 99.6 |

The effectiveness of the products obtained by the process of this invention as dispersants in fuel oil is shown by the results of the carbon black suspension test (Table II). In this test a paste containing 20% by weight of carbon black in a white mineral oil base (minimum Saybolt color, 30+) is prepared by milling the carbon black in oil in a ball mill for 24 hours. For this test, 3 grams of the paste and 70 ml. of additive treated kerosene are placed in a blender and mixed at a low speed for 3 minutes whereupon 0.3 ml. of distilled water is added and the mixing is continued for an additional minute. The suspension is immediately poured into a 4-ounce oil sample bottle and stored in an upright position. Tests are run in duplicate.

The bottles containing the sample blend are examined daily with a flashlight. If carbon gradually settles from the upper portion of the bottle, a demarcation line becomes visible. The ratio of the height of this demarcation line to the height of the oil in the bottle is reported as "percent suspended carbon" by visual inspection. Complete suspension of the carbon (no demarcation line) is designated 100%. Complete precipitation of the carbon is designated 0%.

*Table II*

CARBON BLACK SUSPENSION TEST

| Additive at 0.2% chemical | Percent Suspended Carbon | | | |
|---|---|---|---|---|
| | After 1 Day | After 2 Days | After 5 Days | After 7 Days |
| None | 0 | | | |
| | 0 | | | |
| Product of Example 7 | 100 | 100 | 100 | 100 |
| | 100 | 100 | 100 | 100 |

What is claimed is:
1. A process for the preparation of liquid, oil-soluble phosphorus-containing compositions which comprises heating at a temperature from about 130° C. to about 250° C., a mixture of a chlorinated hydrocarbon polymer of a lower mono-olefin containing from about 0.1% to about 20% by weight of chlorine, and from about 0.25 mole to about 2.0 moles of phosphorus trichloride per atom of chlorine in said polymer, and then contacting the mass with a nitrogen compound selected from the class consisting of ammonia, pyridine, and aliphatic hydrocarbon amines to remove a substantial portion of the water-soluble chlorine.

2. The process of claim 1 characterized further in that the chlorinated hydrocarbon polymer has a molecular weight within the range of from about 350 to about 50,000.

3. The process of claim 1 characterized further in that the chlorinated hydrocarbon polymer is derived from an olefin having from two to four carbon atoms.

4. A process for the preparation of liquid, oil-soluble phosphorus-containing compositions which comprises heating at a temperature from about 130° C. to about 250° C., a mixture of a chlorinated hydrocarbon polymer of a lower mono-olefin having a molecular weight within the range of from about 350 to about 50,000 and containing from about 0.1% to about 20% by weight of chlorine, and from about 0.25 to about 2.0 moles of phosphorus trichloride per atom of chlorine in said polymer, and then contacting the mass with aliphatic hydrocarbon amine to remove a substantial portion of the water-soluble chlorine.

5. The process of claim 4 characterized further in that the chlorinated hydrocarbon polymer is derived from an olefin having from two to four carbon atoms.

6. The process of claim 5 characterized further in that the aliphatic hydrocarbon amine is an alkylene amine.

7. The process of claim 6 characterized further in that the alkylene amine is a commercial mixture of ethylene amines having an average molecular weight corresponding to that of tetraethylene pentamine.

8. A process for the preparation of liquid, oil-soluble phosphorus-containing compositions which comprises heating at a temperature from about 130° C. to about 250° C., a mixture of a chlorinated olefin polymer having a molecular weight within the range of from about 350 to about 50,000 and containing from about 0.1% to about 20% by weight of chlorine, and from about 0.25 mole to about 2.0 moles of phosphorus trichloride per atom of chlorine in said chlorinated olefin polymer, and then contacting the mass with ammonia to remove the substantial portion of the water-soluble chlorine.

9. A process for the preparation of liquid, oil-soluble phosphorus-containing compositions which comprises heating at a temperature from about 130° C. to about 250° C. of a chlorinated olefin polymer having a molecular weight within the range of from about 350 to about 50,000 and containing from about 0.1% to about 20% by weight of chlorine, and from about 0.25 mole to about 2.0 moles of phosphorus trichloride per atom of chlorine in said chlorinated olefin polymer and then contacting the mass with pyridine to remove a substantial portion of the water-soluble chlorine.

References Cited by the Examiner

UNITED STATES PATENTS

| | | | |
|---|---|---|---|
| 2,181,144 | 11/1939 | Morway et al. | 260—94.9 |
| 2,261,757 | 11/1941 | Fawcett | 260—94 |
| 2,262,813 | 11/1941 | Morway et al. | 252—49.9 X |
| 2,291,403 | 7/1942 | Morway et al. | 260—94.9 |
| 2,683,169 | 7/1954 | Jensen et al. | 260—543 |
| 2,685,602 | 8/1954 | Woodstock et al. | 260—543 |
| 3,033,890 | 5/1962 | Le Suer | 252—32.5 X |
| 3,115,465 | 12/1963 | Orloff et al. | 252—49.9 |
| 3,115,466 | 12/1963 | Orloff et al. | 252—49.9 |

LORRAINE A. WEINBERGER, *Primary Examiner.*

DANIEL E. WYMAN, *Examiner.*

P. P. GARVIN, B. EISEN, H. C. WEGNER,
*Assistant Examiners.*